United States Patent [19]

Sterling

[11] Patent Number: 4,986,855

[45] Date of Patent: Jan. 22, 1991

[54] PRODUCT AND PROCESS FOR PREPARATION THEREOF

[75] Inventor: Roy E. Sterling, Edmonton, Canada

[73] Assignee: 501 Alberta Honey Producers Co-operative Limited, Edmonton, Canada

[21] Appl. No.: 417,714

[22] Filed: Oct. 5, 1989

[51] Int. Cl.$^5$ ................................................. C13F 1/02
[52] U.S. Cl. ........................................ 127/60; 127/58; 426/658
[58] Field of Search ................ 127/58, 16, 60, 61; 426/658; 23/301

[56] References Cited

U.S. PATENT DOCUMENTS

| | | | |
|---|---|---|---|
| 4,472,450 | 9/1984 | Platt, Jr. et al. | 127/61 |
| 4,504,516 | 3/1985 | Schanze | 426/658 |
| 4,529,608 | 7/1985 | Szejtli et al. | 426/658 |
| 4,532,143 | 7/1985 | Brain et al. | 426/658 |

FOREIGN PATENT DOCUMENTS 376338  9/1938  Canada.

Primary Examiner—Chung K. Pak
Attorney, Agent, or Firm—Berman, Aisenberg & Platt

[57] ABSTRACT

There is provided a new and useful honey product and a process for the preparation thereof, the process comprising adding a predetermined quantity of seed honey to a mass of honey, treating the mass of honey a first time to physically break up crystal groups, holding the mass of honey a first time for a predetermined period to allow crystallization, treating the crystallized honey at least one additional time to physically break up crystal groups, and holding the honey a second time for a predetermined period.

25 Claims, No Drawings

PRODUCT AND PROCESS FOR PREPARATION THEREOF

This application relates to a process for the preparation of a creamed honey product and to the product thereby obtained.

BACKGROUND OF THE INVENTION

As far as is known, there has always been a problem among honey producers in achieving a creamed honey product having desirable properties and having good stability relative to those properties over a reasonable shelf life. Furthermore, the desire for particular properties has tended to change over time.

Honey producers have generally produced both liquid and creamed honeys. It has almost invariably been the case that the creamed honeys have rapidly crystallized into a relatively hard mass. Furthermore, the size of the crystals or of the crystal groupings has often been such as to result in a relatively coarse product. Clearly a desirable property for a creamed honey is smoothness.

For a number of years liquid honey has been available in so-called squeeze bottle containers. Such containers are utilized with a variety of closure means, but, once the closure means has been placed in the open position, all such containers are inverted and a desired amount of product is ejected by squeezing the nonrigid container. There has been an ongoing desire to produce a creamed honey product which will retain properties permitting it to be utilized in a similar squeeze bottle container.

Such a product must retain smoothness and viscosity properties over a reasonable shelf life. To date no such creamed honey product has been made available.

The present invention is directed toward such a creamed honey product.

PRIOR ART

Various honey products have been proposed in the past and have been made the subject of patents. Two of those which relate to creamed honey are U.S. Pat. No. 1,987,893, issued to Cornell University on Jan. 15, 1935; and Canadian Patent No. 376,338, issued to MacFeeters on Sept. 6, 1938. Neither of these patents includes the process steps of the present application nor will they result in the creamed honey product of the present invention.

SUMMARY OF THE INVENTION

A process has now been developed which approaches the crystallization of liquid honey in two ways to produce a creamed honey product. First, the liquid honey is seeded with finely ground seed honey granules to provide evenly distributed crystallization cites throughout the mass of liquid honey to encourage the liquid honey to crystallize into smaller finer crystals at these cites rather than into the large coarse crystals that would otherwise result.

Second, the honey is treated at various stages in the crystallization process to break up larger crystals and crystal groups.

The resulting product is of a consistency which is suitable for use with a squeezable container and is sufficiently stable to maintain its consistency over an acceptable shelf life at room temperature.

Thus, the invention provides a process for the preparation of a honey product, the process comprising adding a predetermined quantity of seed honey to a mass of liquid honey; treating the mass of honey a first time to physically break up crystals and crystal groups; holding the crystallized honey a first time for a predetermined period to allow crystallization to occur; treating the crystallized honey at least one additional time to physically break up crystals and crystal groups; and holding the honey a second time for a predetermined period.

In the preferred case the crystallized honey is treated a total of three times to break up crystals and crystal groups.

In the preferred case the treatment of the crystallized honey comprises pumping the honey through a positive displacement pump.

DETAILED DESCRIPTION OF THE PREFERRED EMBODIMENTS

Liquid honey if permitted to crystallize naturally will normally form large coarse crystals and will invariably result in a relatively solid product of a consistency, for example, which may or may not be spreadable, but which is in the nature of a rather solid product.

It has long been known that honey can be induced to crystallize in smaller crystals and crystal groups by seeding liquid honey with ground crystalline honey. The seed honey provides crystallization cites which initially lead to formation of smaller crystals. The resulting creamed honey product has a much more desirable texture and consistency.

Unfortunately, the creamed honey product produced from seed honey was invariably unstable and would rather quickly revert to the harder and more granular creamed honey product.

Liquid honey is of a consistency that makes use by the average consumer somewhat difficult. This is particularly so in attempting to transfer the liquid honey from a retail container to a food product in association with which honey would normally be eaten as, for example, bread. This transfer is, in short, often quite messy, particularly when attempted by younger children.

To alleviate this problem to some extent liquid honey is currently often sold in squeezable bottles or containers having an appropriate closure device with an orifice of, say, 0.25 inch, and from which a liquid honey can be ejected by inverting and squeezing the container. The product can thus be transferred directly to the food product in association with which it will be eaten.

While the problems associated with hardened creamed honey differ from those associated with liquid honey, there has nonetheless been a strong desire to have available creamed honey which can be marketed in a similar squeezable container. To date the problems discussed above have always prevented the use of squeezable containers for creamed honey because the required texture and consistency for both attractiveness of product and usability of squeezable containers could not be maintained.

A "squeezable" creamed honey can be produced according to the following process.

While not part of the invention as such, liquid honey would normally be treated in the same way as is conventional among most, if not all, commercial honey producers. That is to say, the raw liquid honey is first pasteurized and then filtered to remove impurities. The preferred pasteurization temperature is between 150° to 160° F. and may be carried out in a normal high temperature short time pasteurizer which is exemplified by typical dairy type plate heat exchangers.

Filtration is preferably carried out utilizing a 100 mesh stainless steel filter coated with a diatomaceous earth (Kenite 3000 ™ or equivalent filter media).

The liquid honey is preferably cooled immediately after the pasteurization and filtration steps. The temperature to which the honey is chilled is chosen to be below the temperature at which the seed honey to be added subsequently would melt and above the temperature at which hard granulation would occur. The most preferred temperature is 78° to 80° F. This temperature is preferably maintained until the final process step to be discussed below. The cooling step may be carried out with the same type of plate heat exchanger as that used for the pasteurization step.

Finely ground seed honey is next added to the liquid honey. It is desirable that the seed honey be thoroughly mixed with the liquid honey but also that the mixing be sufficiently gentle to minimize air entrainment. In that regard a ribbon type mixer operated at a speed of 33 to 44 rpm, and preferably 44 rpm, has been found suitable.

Seed honey is preferably added to comprise 25% of the total resulting honey volume. In that regard use of an insufficient amount of seed honey results in the formation of larger crystals resulting in a very coarse hard granulation. As indicated, the preferred amount of seed honey is 25% by volume of the total honey. Adding additional seed honey will produce the required product but simply increases production cost and reduces net yield.

The seed honey is hard granulated honey which has been ground. It is preferably very finely ground to have a particle size which will freely pass through an 80 mesh screen.

The mixture is then pumped through a positive displacement pump into a storage tank where it is held to allow substantially complete crystallization of the liquid to occur. The temperature requirement is as discussed above and is preferably maintained at 78° to 80° F. in the storage tank. The mixture is held in the tank until crystallization has advanced to the required extent. This period will normally be at least 96 hours.

The crystallized honey is then transferred to a second storage tank. Again a positive displacement pump is preferably used to effect this transfer. The temperature is preferably maintained with the constraints discussed above and most preferably in the 78° to 80° F. range.

The effect of the positive displacement pumps utilized in the transfer steps is to physically break down the honey crystals and crystal groups in such a way that they will not continue to grow or reform into groups. Any other means apart from a positive displacement pump may be utilized provided the desired breakup of crystals and crystal groups is achieved.

The crystallized honey is preferably pumped a third time through the positive displacement pump or whatever other apparatus has been used to effect the crystal breakup. The honey is at this point preferably pumped directly to a filling line and into retail containers. While a great advantage of the product of the present invention is its use in squeezable bottles, it is of course possible to utilize any other conventional container.

The temperature is preferably maintained in the 78° to 80° F. range through this third transfer and container filling step.

The packaged product is then preferably placed in a cool storage area and held for a period of time sufficient to permit the crystallized honey to stabilize. This holding period is preferably carried out at a temperature of about 54° F. for a period of preferably at least 96 hours.

The 54° F. holding temperature in the final step is in a range which is optimum for crystallization. Accordingly, in the event that the process steps have not been correctly carried out, so that crystal breakup has been insufficient to result in a stable product, it is highly likely that this storage step will provide evidence of that fact through the appearance of hard or granular crystallization.

In the normal course, however, the product will after the stabilization period have an acceptable shelf life at room temperature. For example, the consistency and smoothness will be maintained for up to a year. At 54° F. or cooler, the product will have an essentially unlimited shelf life. Refrigeration is not, however, required.

Thus it is apparent that there has been provided in accordance with the invention a process for the preparation of a creamed honey product that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What is claimed is:

1. A process for the preparation of a honey product, said process comprising:
   adding a quantity of seed honey to a mass of honey while maintaining said mass of honey below the melting point of said seed honey and above the temperature at which hard granulation would occur prematurely;
   allowing the resulting mass of honey to begin crystallization;
   treating the mass of honey a first time to physically break up existing and forming crystal groups;
   holding the mass of honey a first time for a predetermined period sufficient to allow crystallization of the honey;
   treating the resulting honey at least one additional time to physically break up crystal groups; and
   holding said honey a second time for a period sufficient to stabilize the resulting honey.

2. The process of claim 1 wherein said mass of honey is initially in a liquid state.

3. The process of claim 1 wherein said mass of honey is pasteurized prior to adding said seed honey.

4. The process of claim 1 wherein said mass of honey is filtered prior to adding said seed honey.

5. The process of claim 3 wherein said mass of honey is filtered after being pasteurized.

6. The process of claim 5 wherein said mass of honey is cooled following the filtration to a temperature below that at which seed honey would melt and above that at which hard granulation would occur prematurely.

7. The process of claim 6 wherein said temperature is in the range of about 78° to about 80° F.

8. The process of claim 1 wherein said quantity of seed honey is at least about 25% by volume of total honey volume.

9. The process of claim 6 wherein said quantity of seed honey is at least about 25% by volume of total honey volume.

10. The process of claim 1 wherein said seed honey has a particle size which will pass through an 80 mesh screen.

11. The process of claim 1 including the step of thoroughly mixing said seed honey with said mass of honey.

12. The process of claim 1 wherein said mixing is carried out with a ribbon mixer at 33 to 44 rpm.

13. The process of claim 1 wherein said treating steps comprise pumping said crystallized honey through a positive displacement pump.

14. The process of claim 1 wherein the first holding time is at least about 96 hours.

15. The process of claim 14 wherein the mass of honey is maintained at about 78° to 80° F. during the first holding time.

16. The process of claim 1 wherein the step of treating the resulting honey at least one additional time comprises treating the resulting honey two additional times.

17. The process of claim 1 wherein the second holding time is at least about 96 hours.

18. The process of claim 17 wherein the resulting honey is maintained at bout 54° F. during said second holding time.

19. The process of claim 1 wherein the resulting honey is placed in retail packaging prior to the second holding time.

20. A process for the preparation of a honey product said process comprising:
mixing a quantity of seed honey with a quantity of liquid honey while maintaining said liquid honey below the melting point of said seed honey and above the temperature at which hard granulation would occur prematurely;
allowing said mixture to crystallize;
treating the crystallized honey to physically break up crystal groups;
holding the resulting honey a first time for a period sufficient to allow crystallization to begin;
treating the resulting honey at least one additional time to physically break up crystal groups; and
holding the resulting honey a second time for a period sufficient to stabilize the honey.

21. The process of claim 20 wherein said liquid honey is maintained below the melting point of said seed honey and above the temperature at which hard granulation would occur prematurely, from the beginning of the mixing step until the end of the last of the treating steps.

22. The process of claim 21 wherein the treating steps comprise pumping said honey through a positive displacement pump.

23. The process of claim 22 wherein the temperature of said honey is maintained at about 54° F. during the second holding period.

24. The process of claim 23 wherein the first and second holding periods are at least about 96 hours.

25. The process of claim 24 wherein said seed honey comprises at least about 25% by volume of the mixture.

* * * * *